No. 730,518. Patented June 9, 1903.

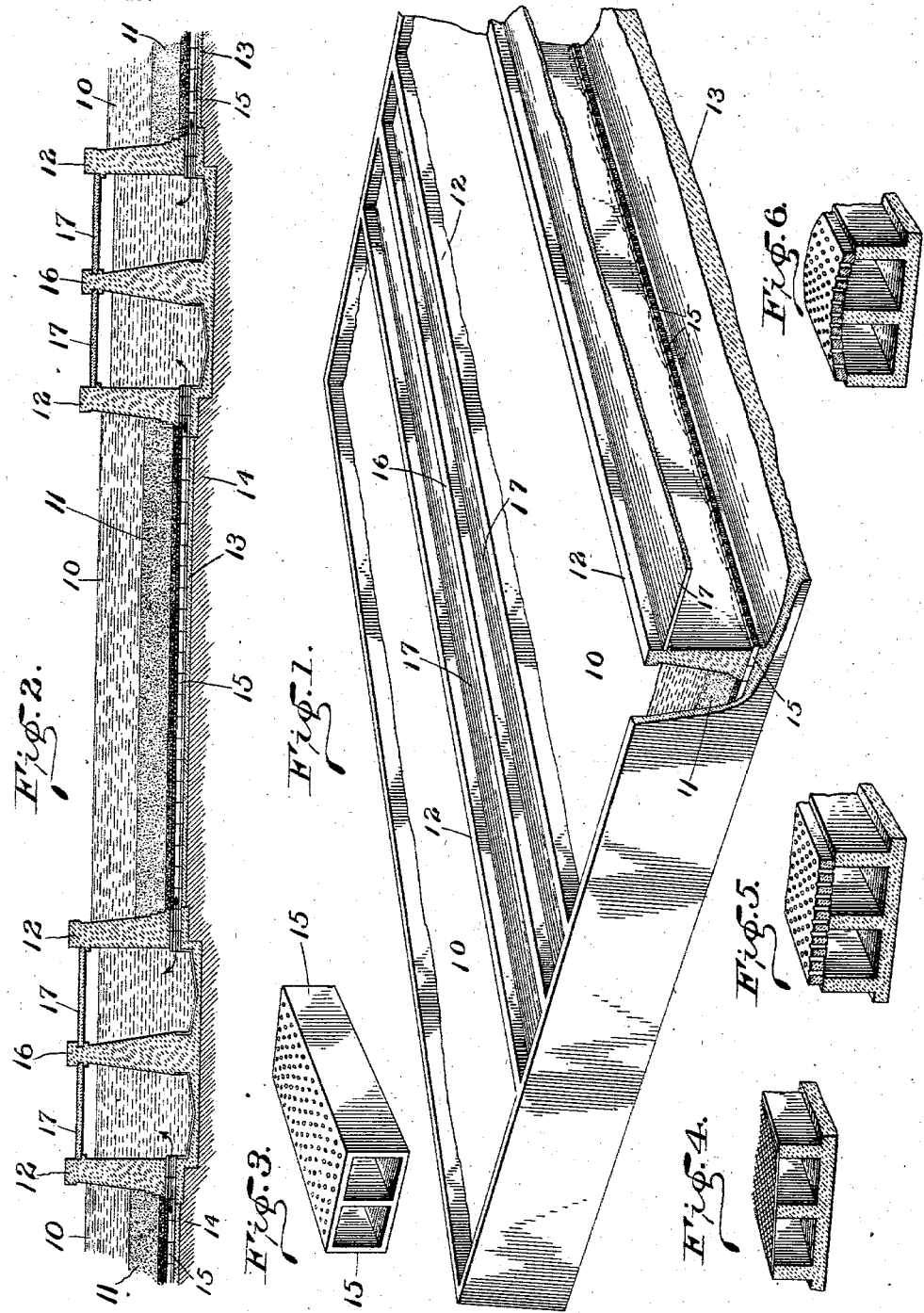

UNITED STATES PATENT OFFICE.

FREDERICK A. W. DAVIS, OF INDIANAPOLIS, INDIANA.

FILTERING SYSTEM.

SPECIFICATION forming part of Letters Patent No. 730,518, dated June 9, 1903.

Application filed November 13, 1901. Serial No. 82,140. (No model.)

*To all whom it may concern:*

Be it known that I, FREDERICK A. W. DAVIS, a citizen of the United States, residing at Indianapolis, in the county of Marion and State of Indiana, have invented certain new and useful Improvements in Filtering Systems, of which the following is a specification.

The principal object of my invention is to provide an apparatus for filtering water for use in waterworks systems and the like which shall be capable of being easily kept clean.

A disadvantage incident to many constructions is that the conduits which receive the water from the filtering-beds and convey the same to the clear-water basins or receptacles are difficult of access, and consequently when they become foul can only be cleaned with great difficulty and generally at the expense of destroying or taking apart some portions of the structure. In many previous constructions also the arrangement is such that the water must flow toward a central or other certain point, which frequently causes "coursing" in the filter-bed and other disadvantages.

In my improved filtering apparatus both the filter-beds and the clear-water basins or receptacles are comparatively narrow and are thus more numerous in a given area, so that shutting off any one or more of them subtracts only a small proportion from the total effective capacity, while the area being smaller the time occupied in cleaning is less.

A filtering apparatus embodying my said invention will be first fully described, and the novel features thereof then pointed out in the claims.

Referring to the accompanying drawings, which are made a part hereof, and on which similar reference characters indicate similar parts, Figure 1 is a perspective view illustrating the general form and arrangement of filter-beds and clear-water basins or receptacles in an apparatus designed to embody my invention; Fig. 2, a transverse vertical sectional view thereof, illustrating the construction; Fig. 3, a perspective view on an enlarged scale, illustrating the form and construction of a conduit-section, such as is placed at the bottom of the filter-beds; and Figs. 4, 5, and 6 detail perspective views, respectively, of alternate forms of conduit construction.

Raw water is shown at 10, resting upon beds of filtering material 11 between walls 12, the inclosed space forming one basin or section of my inclosed filtering apparatus. In building this structure I first provide an impervious floor 13, resting upon the earth 14, and in said floor I provide numerous conduits 15, which lead directly through from one side to the other and the open ends of which open into the clear-water basins between the walls 12 and 16. As these clear-water basins are upon both sides of the raw-water basins or filtering-beds, it is obvious that when the basins are empty free access may be had through the conduits below the filter-beds from one clear-water basin to the other, and consequently that said conduits may be cleaned by being washed out with a hose or otherwise without disturbing any part of the structure. The various basins or receptacles being of comparatively small area, the filtering beds or apparatus as a whole may be continually gone over one section after another, and in doing this only one section need be shut off or out of use at any one time. The surface of the body of filtering material 11 may also be removed and cleaned at the same time, and when sand or other materials of which it is composed have been cleaned it may be replaced for further service.

The conduits may be of any desired form or construction. In Figs. 3, 4, 5, and 6 I have shown four different constructions. The bottom and sides of these conduits should be imperforate and impervious to water, while the tops should be porous or perforated, thus permitting the water to enter said conduits freely as it descends through the bed of filtering material resting thereon. As best shown in Fig. 1, the open ends of all these conduits are arranged to discharge individually and directly into the clear-water basins or receptacles and are capable of being cleaned (or otherwise treated) individually and separately.

The bottoms and walls of the clear-water receptacles are composed of imperforate and substantially impervious material, such as concrete, and are provided with suitable covers, as 17, which can be removed for the purposes of cleaning and airing, but which when in place when the filtering system is in use exclude the dirt, germs, and microbes, so that the water is kept clean and in good healthful condition.

The water, as will be readily understood, is to be admitted and discharged through pipes in any usual or approved manner. The system of pipes and valves, as it forms no part of my present invention, will not be shown or described herein.

Having thus fully described my said invention, what I claim as new, and desire to secure by Letters Patent, is—

1. A filtering system consisting of an impervious bottom, a subbottom composed of a plurality of transverse walls separated so as to form a plurality of closely-arranged transverse channels, a perforated or reticulated top supported by said transverse walls, retaining-walls resting upon the ends of said transverse walls and forming the side walls to the raw-water basins, a filter-bed resting above the perforated or reticulated top between the retaining-walls, outside retaining-walls resting upon the impervious bottom at a distance from the open ends of the transverse channels parallel with the first-mentioned retaining-walls and forming together with said first-mentioned walls the side walls to the clear-water basins, covers to said clear-water basins, and end walls connecting said outside retaining-walls with the first-mentioned retaining-walls and also connecting the ends of the first-mentioned retaining-walls, substantially as and for the purpose set forth.

2. A filtering system consisting of an impervious bottom, depressed channels formed therein, a plurality of transverse walls upon said bottom between the depressed channels and extending from one to the other, said transverse walls being separated so as to form a plurality of closely-arranged transverse channels, a reticulated or perforated cover resting upon said transverse walls, a filter-bed resting upon said cover, a pair of walls 12 resting upon the opposite ends of said transverse walls, a pair of walls 16 arranged substantially parallel with the walls 12 and resting upon the depressed portions of the impervious bottom, and a suitable inclosing wall, substantially as and for the purpose set forth.

3. A filtering system, consisting of an impervious bottom having a plurality of longitudinal channels formed therein, the portions constituting the bottoms of said channels being depressed below the general level, a plurality of transverse walls arranged upon the portions of the bottom adjacent the channels, said transverse walls being separated so as to form a plurality of closely-arranged transverse channels ending at the depressed portions of the impervious bottom, a perforated or reticulated cover resting upon said transverse walls, a filter-bed resting upon said cover, a pair of walls 12 resting upon the transverse walls one upon each side of the longitudinal channels, and a wall 16 substantially parallel with the walls 12 and arranged therebetween in the depressed channels, substantially as and for the purpose set forth.

In witness whereof I have hereunto set my hand and seal, at Indianapolis, Indiana, this 7th day of November, A. D. 1901.

FREDERICK A. W. DAVIS. [L. S.]

Witnesses:
CHESTER BRADFORD,
ALBERT F. ZEARING.